(12) United States Patent
Woltmann

(10) Patent No.: US 6,672,071 B2
(45) Date of Patent: Jan. 6, 2004

(54) METHODS FOR OPERATING GAS TURBINE ENGINES

(75) Inventor: Ivan Elmer Woltmann, West Chester, OH (US)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 09/965,350

(22) Filed: Sep. 27, 2001

(65) Prior Publication Data

US 2003/0056518 A1 Mar. 27, 2003

(51) Int. Cl.$^7$ ................................................. F02C 7/22
(52) U.S. Cl. ............................................ 60/776; 60/725
(58) Field of Search ............................. 60/39.281, 725, 60/776

(56) References Cited

U.S. PATENT DOCUMENTS

| | | | |
|---|---|---|---|
| 5,349,811 A | * | 9/1994 | Stickler et al. .......... 60/39.281 |
| 5,575,153 A | | 11/1996 | Ito et al. |
| 5,584,171 A | | 12/1996 | Sato et al. |
| 5,743,079 A | | 4/1998 | Walsh et al. |
| 5,797,266 A | * | 8/1998 | Brocard et al. ................ 60/725 |
| 6,205,765 B1 | * | 3/2001 | Iasillo et al. ................... 60/725 |
| 6,212,871 B1 | | 4/2001 | Rakhmailov |
| 6,274,945 B1 | | 8/2001 | Gilbreth et al. |
| 6,336,806 B1 | * | 1/2002 | Paschereit et al. ............ 60/725 |

* cited by examiner

*Primary Examiner*—Louis J. Casaregola
(74) *Attorney, Agent, or Firm*—William Scott Andes; Armstrong Teasdale LLP; Robert B. Reeser, III

(57) ABSTRACT

A combustion control system controls a turbine engine that includes a fuel manifold and a plurality of fuel injectors. The control system includes a fuel pulsator and a controller. The fuel pulsator is coupled in flow communication with the plurality of injectors and the fuel manifold. The controller is coupled to the fuel pulsator such that the pulsator is between the controller and the fuel manifold. The controller is variably selectable and configured to facilitate promoting stable combustion.

5 Claims, 2 Drawing Sheets

METHODS FOR OPERATING GAS TURBINE ENGINES

BACKGROUND OF THE INVENTION

This invention relates generally to gas turbine engines, and more particularly, to methods and apparatus for operating gas turbine engines.

Gas turbine engines typically include high and low pressure compressors, a combustor, and at least one turbine. The compressors compress air which is mixed with fuel and channeled to the combustor. The mixture is then ignited for generating hot combustion gases, and the combustion gases are channeled to the turbine which extracts energy from the combustion gases for powering the compressor, as well as producing useful work to propel an aircraft in flight or to power a load, such as an electrical generator.

Because gas turbine engines must be capable of operating in a plurality of operating conditions, stable burning is essential for engine operation over a wide range of engine operating conditions. More specifically, stable combustion facilitates reducing engine blowout while achieving engine rated thrust or power levels. Furthermore, stable combustion also facilitates reducing engine screech, rumble, or howl. Screech is characterized by high pressure acoustic oscillations at a frequency above 300 Hz., and may be caused by a coupling/feedback mechanism of the combustion process with a natural acoustic transverse mode (radial and tangential) of a combustion chamber defined within the combustor. Rumble or howl is also characterized by high pressure acoustic oscillations, but at frequencies below 300 Hz. More specifically, at such frequencies, combustion instability may be caused by a coupling/feedback mechanism of the combustion process with a natural axial mode of the combustion system. Continued operation with screech, rumble, or howl may cause hardware damage to occur.

To facilitate reducing potentially harmful combustion resonance, at least some known combustors have been modified with extensive and expensive design changes. Such design changes may include the addition of acoustic suppressors that are tuned to facilitate reducing resonant frequencies. Frequent maintenance may occur if a combustion instability persists in a product introduced in the field. Additionally, damage to fuel nozzles, liners, and other combustor components including suppressors may occur with continued operation during combustion instability.

Other known combustors include complex active combustion control systems (ACC) that include a pulsator coupled upstream from a controller that is coupled between the pulsator and the fuel manifold. The pulsator pulses the fuel flow to the fuel manifold at a resonant frequency to enhance combustion stability. The controller receives continuous feedback from the combustor and times the fuel pulsation such that the fuel flow increases at the low portions of the oscillation and decreases at high portions of the oscillation, such that the system serves as a wave cancellation. However, because the controller is downstream from the pulsator, establishing the accurate timing of the controller with respect to the pulsator may be difficult. Furthermore, such systems may provide only limited benefits when spinning tangential modes instead of merely standing acoustic modes are present during engine operations. Moreover, during such conditions, because of the difficulty in establishing the controller timing, the pulsator frequency may become in tune with the resonant frequency, and as a result, may actually increase the resonance of the chamber. If the pulsator can not be set to cancel or detune the resonant frequency, the pulsator is not utilized and an operating range of the combustor may be limited.

BRIEF DESCRIPTION OF THE INVENTION

In one aspect of the invention, a combustion control system for controlling a turbine engine that includes a fuel manifold and a plurality of fuel injectors is provided. The control system includes a fuel pulsator and a controller. The fuel pulsator is coupled in flow communication with the plurality of injectors and the fuel manifold. The controller is coupled to the fuel pulsator such that the pulsator is between the controller and the fuel manifold. The controller is variably selectable and configured to facilitate promoting stable combustion.

In another aspect, a method for controlling an aircraft engine is provided. The engine includes a combustor, a fuel manifold, and a plurality of fuel injectors. The fuel manifold is coupled in flow communication with the fuel injectors for supplying fuel to the combustor. The combustor defines a combustion chamber. The method includes supplying fuel to the combustor fuel injectors through a fuel pulsator and the fuel manifold, wherein the fuel pulsator is coupled to a controller that is upstream from the fuel pulsator; and variably operating the controller to pulse fuel with the fuel pulsator to facilitate promoting stable combustion within the combustion chamber.

In a further aspect, a gas turbine engine is provided that includes a combustor, a fuel manifold, a plurality of fuel injectors, and a fuel control system. The combustor defines a combustion chamber, the plurality of fuel injectors are in flow communication with the fuel manifold. The fuel injectors are configured to supply fuel to the combustion chamber. The fuel control system is coupled to the fuel manifold and the fuel injectors. The fuel control system includes a fuel pulsator and a controller. The fuel pulsator is in flow communication with the fuel manifold, and the controller is coupled to the fuel pulsator such that the pulsator is between the controller and the fuel manifold.

DETAILED DESCRIPTION OF THE INVENTION

Figure 1:
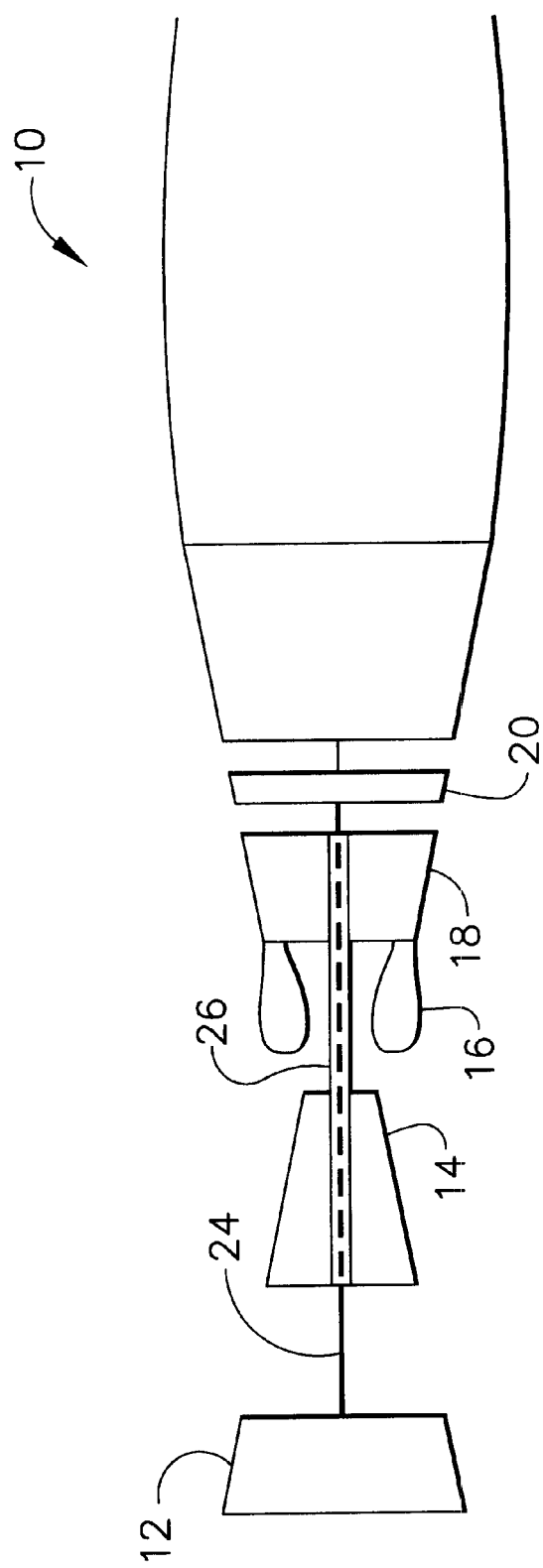
FIG. 1 is schematic illustration of a gas turbine engine.

FIG. 1 is a schematic illustration of a gas turbine engine 10 including a low pressure compressor 12, a high pressure compressor 14, and a combustor 16 that defines a combustion chamber (not shown). Engine 10 also includes a high pressure turbine 18, and a low pressure turbine 20. Compressor 12 and turbine 20 are coupled by a first rotor shaft 24, and compressor 14 and turbine 18 are coupled by a second rotor shaft 26. In one embodiment, engine 10 is a GE90 engine available from General Electric Aircraft Engines, Cincinnati, Ohio.

In operation, air flows through low pressure compressor 12 and compressed air is supplied from low pressure compressor 12 to high pressure compressor 14. Compressed air is then delivered to combustor 16 and airflow from combustor 16 drives turbines 18 and 20.

Figure 2:
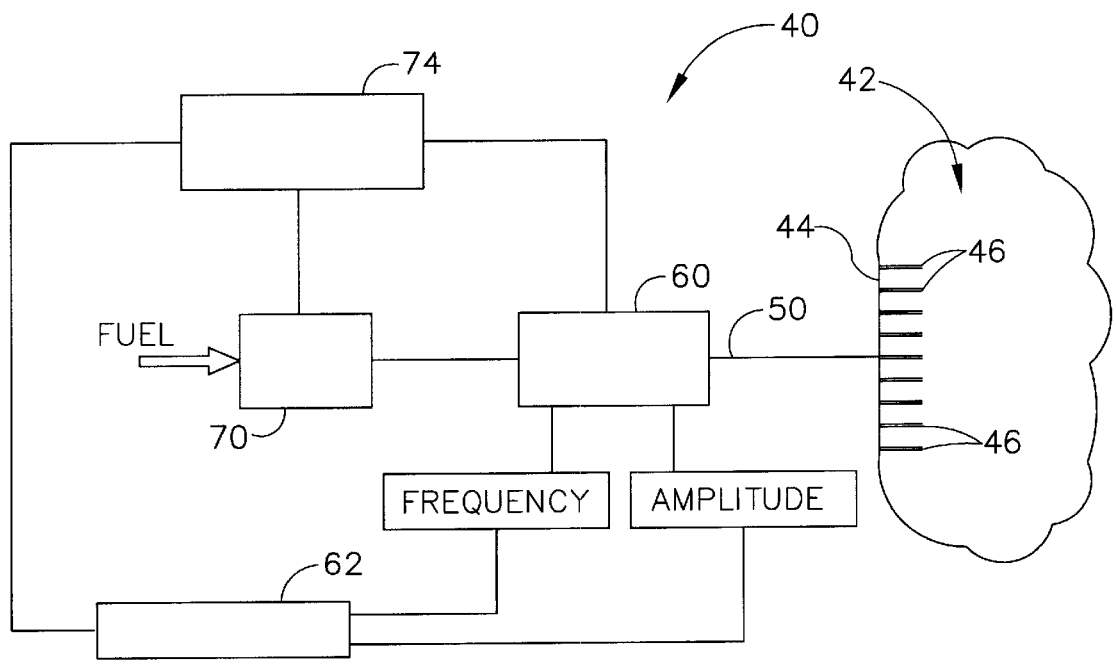
FIG. 2 is a logic diagram of a fuel control system for use with an aircraft engine.
Figure 3:
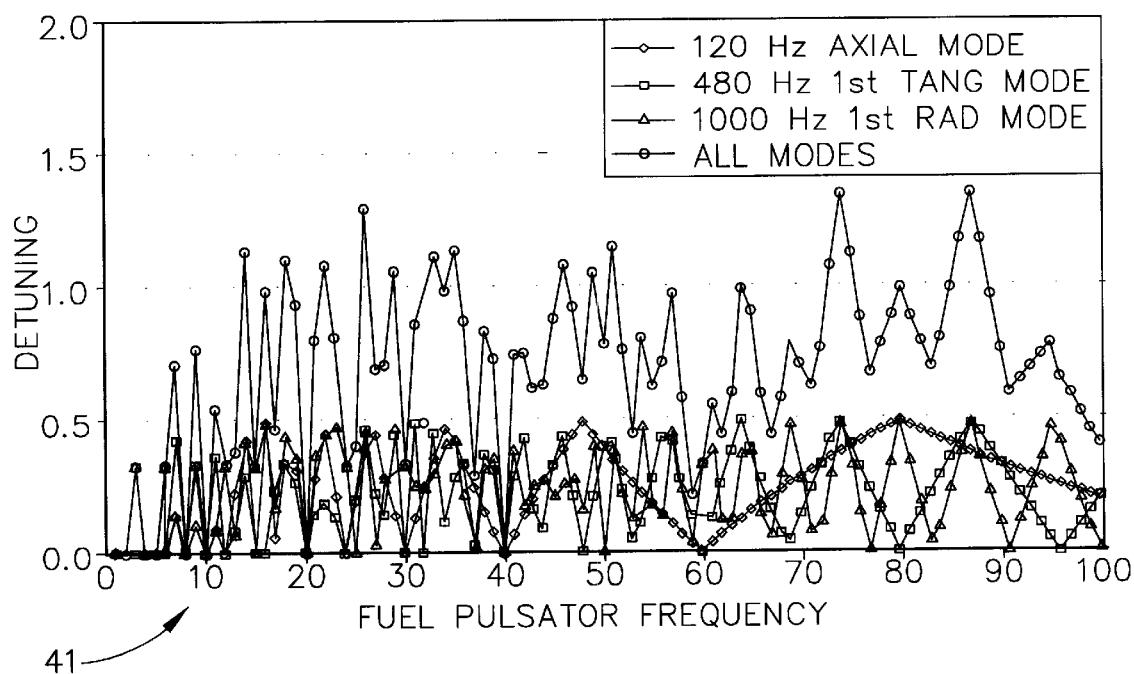
FIG. 3 is an exemplary graph illustrating resonant frequencies that may be present during engine operation and associated fuel pulsator frequencies and detuning frequencies that may be induced by the fuel control system shown in FIG. 2.

FIG. 2 is a logic diagram of a fuel control system 40 for use with an aircraft engine, such as, aircraft engine 10 shown in FIG. 1. Alternatively, fuel control system 40 may be used with other types of gas turbine engines or power generating systems. FIG. 3 is an exemplary graph 41 illustrating resonant frequencies that may be present during engine operation frequencies and associated fuel pulsator frequencies and de-tuning frequencies that may be induced by fuel control system 40 (shown in FIG. 2). More specifically, fuel control system 40 includes logic that facilitates enhanced stable combustion within a combustor, such as combustor 16 (shown in FIG. 1). In an alternative embodiment, fuel control system 40 facilitates enhancing stability within a gas turbine engine augmentor. Fuel control system 40 is coupled to a processor-based engine control system, and is known as a deactive combustion control (DCC). The term processor, as used herein, refers to microprocessors, application specific integrated circuits (ASIC), logic circuits, and any other circuit or processor capable of executing fuel control system 40 as described herein.

The combustor defines a combustion chamber 42 that is in flow communication with fuel control system 40. In the exemplary embodiment, the combustor is a multi-stage combustor. Alternatively, the combustor is a single-stage combustor. More specifically, a fuel manifold 44 is coupled in flow communication with a plurality of fuel injectors 46 that spray fuel into combustion chamber 42 for one stage of the combustor. Fuel manifold 44 includes a main fuel inlet 50 that is in flow communication with injectors 46.

Fuel control system 40 includes a fuel pulsator 60 and a controller 62. In the exemplary embodiment, pulsator 60 is coupled in flow communication with fuel manifold fuel inlet 50 and is applied to only one stage of the combustor. In an alternative embodiment, pulsator 60 is applied to all stages of the combustor. In one embodiment, pulsator 60 is available at Aerospace Engineering Department, Georgia Tech University, Atlanta, Ga., 30332.

Controller 62 is coupled to pulsator 60 such that controller 62 is upstream from pulsator 60, rather than controller 62 being downstream from pulsator 60. More specifically, in the exemplary embodiment, pulsator 60 is coupled between controller 62 and fuel manifold 44. The location of pulsator 60 with respect to manifold inlet line 50 is variable and is selected to provide desired stability and combustion results when using fuel control system 40, and because controller 62 does not receive continuous feedback during engine operation, controller 62 does not need to be coupled between combustion chamber 42 and pulsator 60.

A fuel pump 70 is coupled to fuel pulsator 60. More specifically, pump 70 is coupled to pulsator 60 such that fuel supplied to pump 70 is then discharged downstream through fuel pulsator 60. Fuel pump 70, pulsator 60, and controller 62 are also electrically coupled to a power source 74.

During engine operation, combustion instabilities within combustion chamber 42 are facilitated to be reduced by fuel control system 40. Fuel control system 40 overcomes a need for a control system to be coupled between a combustion chamber and a pulsator, and overcomes a need for continuous feedback. More specifically, controller 62 tunes pulsator 60 to pulse fuel to provide an optimum frequency and amplitude for resonance avoidance within combustion chamber 42. The control system also tunes pulsator 60 to avoid any subharmonics of the resonant frequencies inherent within combustion chamber 42.

During production configuration, controller 62 also provides an additional benefit for turning and durability. For example, if a different resonant mode is identified at various fueling levels or operating conditions within the combustor, controller 62 may be tuned to adjust pulsator 60 to a frequency that avoids resonance. More specifically, controller 62 may be tuned such that pulsator 60 avoids subharmonics of the acoustic frequencies.

Graph 41 illustrates three exemplary acoustic signal modes that may be present during production configuration. More specifically, in the exemplary embodiment, a 120 Hz axial mode, a 480 Hz tangential mode, and a 1000 Hz radial mode are represented. During development, acoustic signal modes are identified and used to determine an initial frequency for operation of pulsator 60, or more specifically, a pulsator frequency to deactivate the three acoustic modes simultaneously. Within graph 41, a tuning level of zero implies that the pulsator frequency is a subharmonic of the acoustic frequency, and that pulsator 60 may actually reenforce the acoustic wave at various points in time. For example, a pulsator frequency of 40 Hz could reenforce all three modes and as such, is avoided by controller 62. On the other hand, as shown in FIG. 3, pulsator frequencies at high detuning levels facilitate avoiding wave reenforcement. For example, a pulsator frequency of 80 Hz could be used to provide broad band detuning of the 120 Hz axial mode, while a pulsator frequency of 74 Hz or 87 Hz could be used to provide detuning of all three modes over a more narrow frequency band.

Controller 62 also enables detuning frequencies to be selected that avoid natural mechanical frequencies of the combustion system hardware. Thus, the combustion process is driven at a frequency that does not couple with an acoustic frequency of combustion chamber 42. More specifically, combustion chamber resonant frequencies are reasonably fixed in range, and as such, once a combustion deactivating or detuning frequency is selected for fuel pulsation, controller 62 controls adjustments of pulsator 60 through the range of engine operations. Accordingly, pulsator frequencies of a smaller magnitude may be induced to combustion chamber 42 in comparison to other known pulsators, and as such, controller 62 facilitates extending a useful life of the combustion hardware. Furthermore, during operating conditions in which combustion instability is not present, pulsator 60 may be de-energized.

The above-described fuel control system is cost-effective and highly reliable. The control system provides an indirect and deactive method for promoting stable combustion that includes pulsing burning fuel at a frequency that avoids natural acoustic resonant frequencies of the combustion chamber and subharmonics of these resonant frequencies. Thus, the combustion process is driven at a frequency that does not couple with an acoustic frequency of the combustion chamber. As a result, the fuel control system facilitates stable combustion in a cost-effective and reliable manner throughout the range of engine operating conditions.

While the invention has been described in terms of various specific embodiments, those skilled in the art will recognize that the invention can be practiced with modification within the spirit and scope of the claims.

What is claimed is:

1. A method for controlling an aircraft engine including a combustor, a fuel manifold, and a plurality of fuel injectors, the fuel manifold in flow communication with the fuel injectors for supplying fuel to the combustor, the combustor defining a combustion chamber, said method comprising:

supplying fuel to the combustor fuel injectors through a fuel pulsator and the fuel manifold, wherein the fuel pulsator is coupled to a controller; and variably operating the controller without continuous feedback to pulse fuel with the fuel pulsator to facilitate promoting stable combustion within the combustion chamber.

2. A method in accordance with claim 1 wherein variably operating the controller further comprises pulsing fuel at a frequency and amplitude that facilitates natural acoustic avoidance within the combustion chamber.

3. A method in accordance with claim 1 wherein variably operating the controller further comprises pulsing fuel at a frequency and amplitude that facilitates avoidance of natural mechanical vibrational modes inherent within the combustion chamber.

4. A method in accordance with claim 1 wherein supplying fuel to the combustor fuel injectors further comprises supplying fuel to the combustor fuel injectors using a fuel pump coupled upstream from the fuel pulsator.

5. A method in accordance with claim 1 wherein supplying fuel to the combustor fuel injectors further comprises supplying fuel to the fuel injectors through a fuel pulsator and the fuel manifold, wherein the fuel pulsator is coupled to a fuel inlet of the fuel manifold.

* * * * *